April 9, 1946.　　　N. J. URQUHART　　　2,397,993
REDUCTION OF METALLIC OXIDE
Filed March 16, 1943　　　3 Sheets-Sheet 3
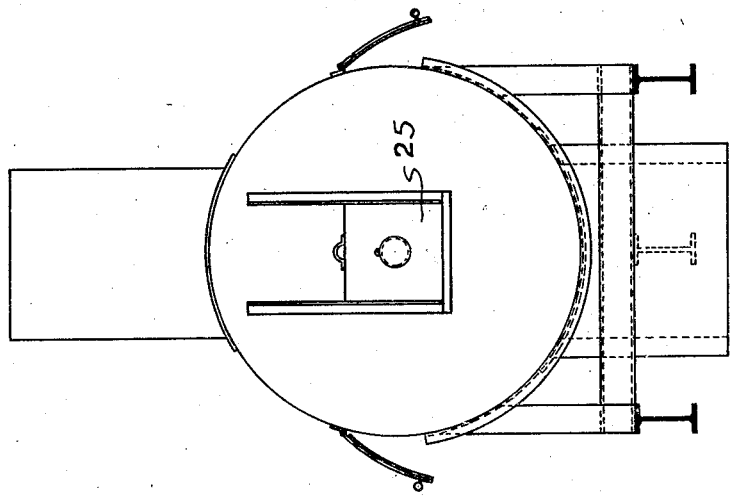
Fig. V
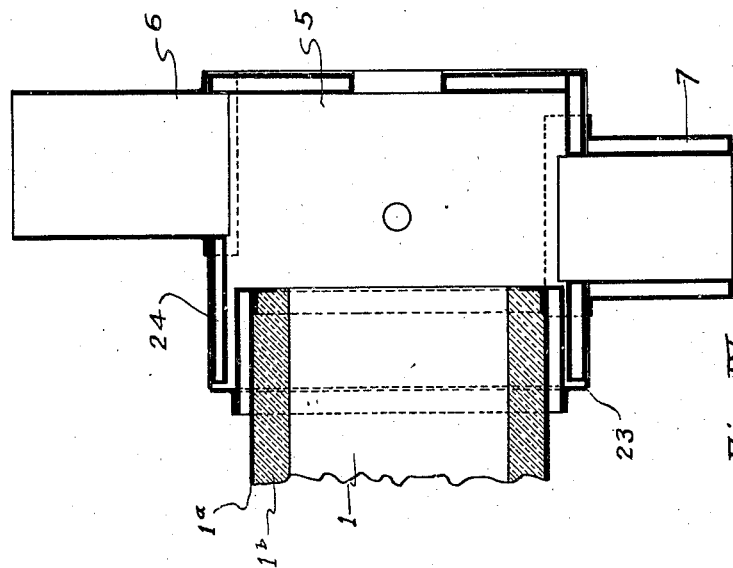
Fig. IV
INVENTOR.
Norman J. Urquhart
BY William B. Wharton
his attorney Patented Apr. 9, 1946

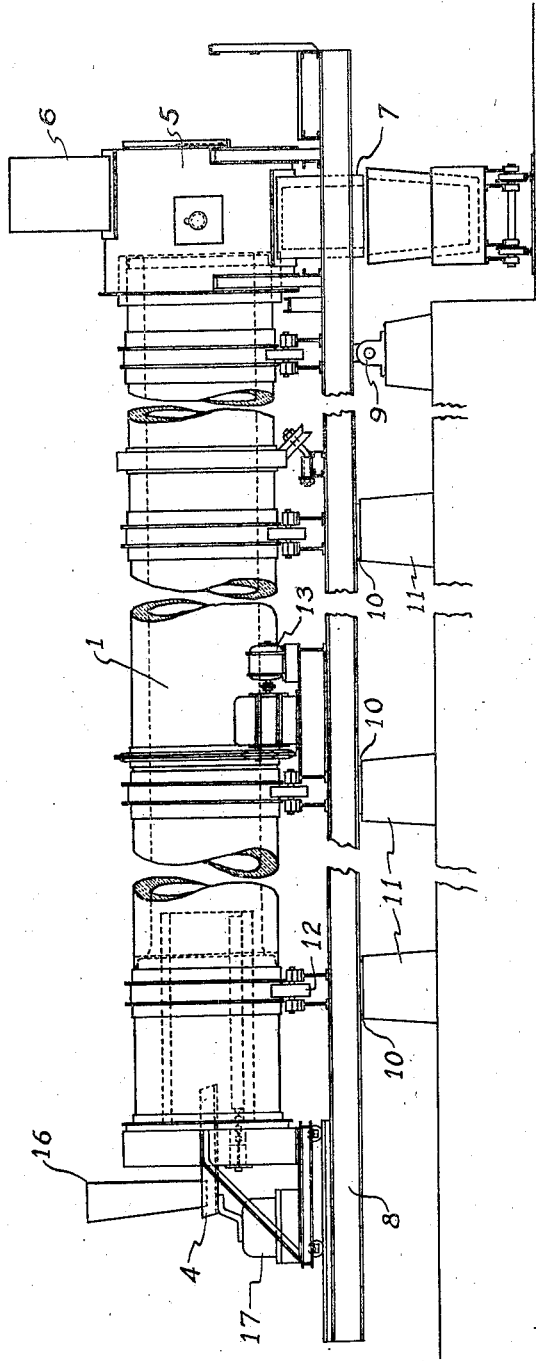
Fig. I

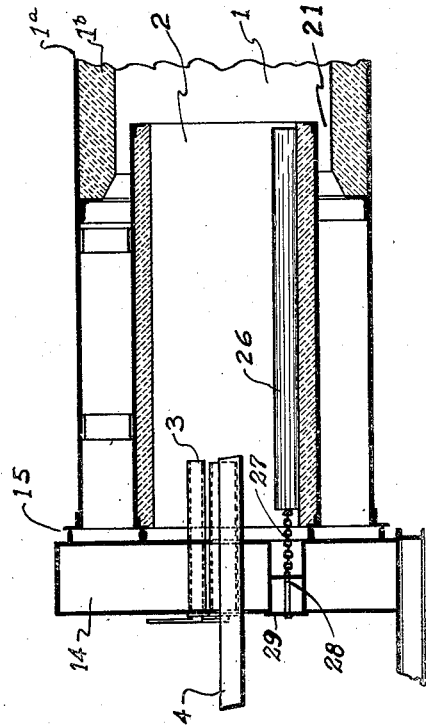
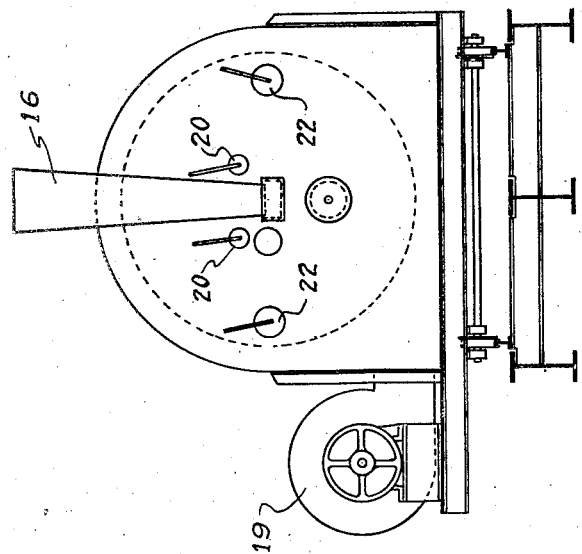

2,397,993

UNITED STATES PATENT OFFICE 2,397,993

REDUCTION OF METALLIC OXIDE

Norman J. Urquhart, Charleroi, Pa., assignor to Combustion Processes Company, a corporation of Pennsylvania Application March 16, 1943, Serial No. 479,361

14 Claims. (Cl. 75—36)

This invention relates to a continuous process for reducing iron ores to the metallic state, and the application herein is a continuation-in-part of my co-pending application Serial No. 406,578, filed August 13, 1941.

A primary object of my invention is to obtain, by means of a continuous process which involves the coking of coal and the combustion of coke and the volatiles thereby produced, a good yield of metallic iron in the form of nodules or other stable bodies of metallic iron, and which is in condition for use in succeeding iron-utilizing and steel-making processes.

Another object of my invention is to produce by a method of the sort above designated an iron in stable metallic condition which has a carbon content so low as to give it particular utility in steel-making operations.

A further object of my invention is to provide a process of the above designated sort in which the metallic iron is produced without the formation of dense viscous and adherent slag and in which the masses of iron produced are approximately free from inclusion of slag or gangue.

My method of producing iron may be summarized briefly by saying that I continuously pass an intimate mixture of finely-divided coal and iron ore, or equivalent material such as mill scale or the flue dust from blast furnaces, through a rotary furnace with coking distillation of the coal and with temperature increase in gradual gradient through the major portion of the furnace. Throughout an effective length of the furnace, reducing conditions are maintained in the charge.

My process is conducted in a rotary furnace of relatively great length and which may be tilted to give adjusted declination from its feeding to its discharge end, so that the progress of the charge through the furnace and the speed at which the furnace is rotated may be correlated.

The accompanying schematic drawings exemplify apparatus of a sort in which my method of reducing iron ores may be conducted. In these drawings:

Fig. I is an elevational view of a furnace installation suitable for conducting the reduction of iron oxide and other oxide ores in accordance with the method of my invention.

Fig. II is an end elevation of the furnace at the entering or feeding end thereof, omitting the feeding mechanism shown in Fig. I.

Fig. III is a fragmentary vertical sectional view through the structure of the furnace adjacent its feeding, or entering, end.

Fig. IV is a fragmentary vertical sectional view taken at the discharging end of the furnace.

Fig. V is an end elevation of the furnace at its discharging end.

Primarily the furnace structure herein shown as exemplary comprises an elongate treating tube 1 made with a metallic shell 1a and a refractory lining 1b. Cooperative with this tube 1 at its receiving end, there is an interiorly placed ignition tube 2 having therein a burner 3 of a sort to utilize oil, gas, or powdered carbonaceous fuel, and a feed duct or chute 4 for the furnace charge. At the discharge end of the furnace there is an enclosed hood or chamber 5 having a stack 6 and discharge duct 7. The entire furnace assembly is carried by a platform 8 tiltably mounted on a pivot 9, and adapted to be adjusted to a desired declination from its receiving to its discharge end by the insertion of shims 10 between the platform and a plurality of supporting pedestals 11. Tube 1 is mounted for rotation about its axis upon a plurality of rollers 12 carried by the platform 8, and is driven by means of an electrical motor 13 through operating connections of any suitable sort.

The receiving end of the furnace is equipped with an air chamber 14 with which the receiving end of tube 1 has an air-tight seal 15. Feed chute 4 has associated with it a charge-feeding hopper 16 and a motor-driven vibrator 17. Air is supplied to air chamber 14 by means of a motor-driven fan 19.

Combustion air for an ignition flame is supplied to the burner 3 and the interior of ignition tube 2 by primary air valves 20. Combustion air to support combustion within the elongate treating tube 1 is introduced into the space 21 between the ignition tube and the shell 1a of the treating tube by way of secondary air control valves 22.

At the discharge end of treating tube 1, there is the hood or chamber 5, which has a gas-tight seal 23 with the end of the treating tube 1, and which is protected from heat by a plurality of water-cooled jackets 24. This hood or chamber 5 is equipped with doors 25, which gives access for breaking up clinkers, or for introducing coke, sand, or other material which it is desired to introduce into a vessel which receives treated material from the furnace by way of discharge duct 7.

The foregoing embodiment of apparatus is exemplary only of one of the many arrangements which may be used to reduce oxide ores in accordance with the method of my invention. In its principles, that method consists in supplying to the furnace a charge composed of finely-divided oxide ore and carbonaceous fuel in proper proportions, and in so controlling combustion conditions within the furnace, the conditions of the charge, the temperature established throughout the furnace, the time of treatment, and other factors, that the reduction of the ore is economically effected. In so operating, the ore is caused to progress downwardly through the furnace at a rate determined by the declination of the furnace from its receiving to its discharge end, and with transfer of heat from the refractory lining of the treating tube to the charge passing therethrough. Rotation of the furnace is conducted at such rotational speed as to give a controlled rate of heat transfer from the furnace wall to the charge, and this rate of heat transfer may be related to the length of the treating tube and the angle of its declination to give a treatment appropriately related to the composition of the charge, the desired form of the reduced product, and to the other conditions of the process.

My method follows the principle of conducting the deoxidizing, or reduction, reaction between components of the charge itself rather than between an oxide ore of the charge and a reducing atmosphere to which it is exposed. For this reason, it is important that the components of the charge be in proper intimate contact with each other and that the charge be in such physical condition that it is susceptible to agitation by rotation of the treating tube adequately to effect heat transfer from the interior of the tube wall to the charge. Previous processes have utilized a charge composed of finely-divided oxide ore and carbonaceous fuel by forming the ore and fuel mixture into briquettes with a suitable binder before the charge is fed to the furnace. Such procedure is time-consuming and expensive and it is an important feature of my invention that I practice the equivalent of such additional briquetting operation within the furnace and in the course of the normal furnace operation in a manner which will be hereinafter described.

The type of combustion is a correlated factor of primary importance. In my process, I utilize an ignition flame to raise the carbonaceous material of the charge to combustion temperature, and to provide a core of flame which may be extended at will a greater or lesser distance; if so desired to supply a substantial proportion of the required total heat to raise the charge to the more elevated temperature at which the reduction reaction takes place. Relating this with the specific apparatus embodiment shown I utilize the burner to burn gas, oil, or finely-divided carbonaceous fuel to produce the igniting and maintaining flame in the ignition tube of the apparatus, and may extend this flame such distance as may be desirable additionally to maintain a reaction temperature within the outer, or treating, tube of the apparatus. Combustion in the treating tube is supported by the secondary air introduced between the treating tube and the ignition tube, and passed downwardly through the tube to support combustion of volatiles given off by the carbonaceous content of the charge in the ignition tube and as the charge proceeds downwardly through the treating tube. It is to be noted that the volatiles preponderantly are driven off from the charge in the ignition tube and form a rich core for a flame which is directed, with its envelope of secondary air, downwardly through the treating tube. It is to be noted that both the primary air and the secondary air move in the direction of fuel movement so that there is uniflow rather than counterflow in the furnace.

Whereas throughout a large proportion of the reaction tube length I supply secondary air sufficient for complete combustion, I maintain a deficiency of primary air in the ignition tube in which volatiles are driven off from the coal of the charge. By maintaining moderate temperature up to about 1200° F. in the ignition tube as rendered possible by utilizing uniflow of gases and charge through the furnace, I avoid the formation of iron silicate, which tends profusely to be formed when the highest temperature of a furnace is at its receiving end, and I am able, also, by the other conditions of the process, to establish a zone of highest temperature adjacent the discharge end of the treating tube, where high temperature is most advantageous. By moving the secondary air in a cone around the products of primary combustion, I am able to extend throughout the relatively great length of the treating tube a flame capable of supplying to the charge adequate heat to maintain the endothermic reduction reaction, without bringing free oxygen substantially into contact with the charge in zones in which the reduction takes place and is completed.

Certain factors are essential to any performance of my method which may be considered successful in reducing the ore, and other factors may be varied within limits, so that an economical time of treatment may be established in accordance with the type of product for which the process is conducted. Thus, I am able to make sponge iron in a relatively short treating period, thus economizing in furnace time and in fuel consumption; or with greater expenditure of time and fuel, I am able to produce a nodular or lump iron in the furnace.

In any event, the fuel and ore are so finely-divided that they are brought into intimate reactive contact, and are formed into lumps equivalent to small briquettes within the furnace, and the primary air and secondary air are so related that high temperature is created only in those portions of the treating tube which lie substantially beyond its entering end; and in the apparatus embodiment shown, beyond the ignition tube of the apparatus. In any event, the apportionment of ore and fuel in the charge is made on the basis of the metallic content of the ore and the volatiles of the fuel, to give a sufficient number of heat units successfully to perform the reduction by contact of the charge with the lining of the treating tube. In any event, the carbonaceous content of the charge itself is such as to give an excess of coke (by which I mean to include the charcoal from vegetable fuel) adequate to provide carbon-monoxide (CO) more than theoretically sufficient to react with the combined oxygen in the oxide content of the ore.

In any event, there is a unidirectional flow of the charge and the combustion gases, and in any event the heating of and in the treating tube is such that there is transferred to the charge in a reaction zone heat sufficient to raise the charge to and maintain it at the reaction temperature.

To describe a typical operation in accordance with my invention, the furnace is first heated by passing a flame from the burner through the ignition tube and the treating tube to bring the charge to a temperature not substantially exceeding 1200° F. The furnace is tilted at an angle suitable to give the desired rate of charge travel through the system, and the speed of rotation of the furnace is adjusted to that angle with reference to the speed at which it will cause the charge to progress from the receiving to the discharging end of the furnace as determined by the length of the treating tube and the condition of the charge. It may be noted that the treating tube desirably is very long, being from 40 feet to as much as 100 feet in length, and even longer. Assuming that the treating tube is about 50 feet long and about 26 inches interior diameter, the time required for treatment will be about 1 to 2 hours and the furnace will be tilted at an angle of about 3° to 4° to give a rate of charge travel conforming to that time of treatment.

It is to be understood the above time of treatment also is determined by the bed depth of the charge in the treating tube. With the other exemplary conditions given, it is to be assumed that the charge bed is about 2 inches deep. With longer furnaces the depth of the bed may be somewhat increased, but I prefer to pass the charge through the furnace in a bed of from about 1 inch to 4 inches in thickness. An excessively deep bed of charge causes an interior layer or zone of the charge to be heated inadequately. Although the relative dimensions of the treating tube may be varied, I prefer to follow substantially the relative proportions for length and diameter of the treating tube as exemplified above. It is obvious that the longer the treating tube the greater will be the output of the furnace for any given period of production.

At this speed of charge travel through the furnace, the treating tube would be revolved at a rotational speed of about 1 to 2 revolutions per minute. When the furnace has been pre-heated to suitable temperature, I begin to feed charge through the furnace. This charge (referring now to the primarily indicated utilization of my method, which is the production of iron oxide ores) consists of a mixture of such ore in finely-divided condition with finely-divided carbonaceous fuel, desirably coal having a relatively high content of volatiles. In order that the mixture of the ore and fuel may be an intimate one, both desirably are reduced to a 5 to 10 mesh screen size, or even finer. In the mixture of the charge, the ore and fuel desirably are roughly so proportioned that the coal will provide from about 8,000 B. t. u. to 12,000 B. t. u. for each pound of metallic iron in the charge. With a high-grade bituminous coking coal, this proportion will be about one pound of the coal to two pounds of metallic iron content of the ore. In the event that the coal content of the charge is adequate to provide the necessary excess of coke for the reduction reaction but is inadequate to supply sufficient heat units to the furnace, the burner may be more strongly operated so that it supplies the heating deficiency of the charge itself, by extending a heating flame substantially throughout the length of the treating tube. If the deficiency in the charge with relation to the particular ore treated and the particular grade of coal used is in the production of an adequate excess of coke to effect and maintain reducing conditions in the charge, a suitable proportional content of similarly divided coke may be added to the charge. Suitable metallurgical additions, such as lime, are added to the charge in quantities adjusted to the character of the ore which is treated and the type of product which the process is purposed to produce, in accordance with well-known metallurgical principles.

Assuming the use of apparatus which is shown as exemplary herein, the ignition tube of the furnace will be brought by means of a small burner flame to an ignition temperature. If the carbonaceous fuel be coal the ignition temperature is within the approximate range of 800° F. to 1200° F. If the fuel be wood, or analogous vegetable fuel, it is in the approximate range of 400° F. to 800° F. When that temperature has been reached, and as I begin to feed the charge to the furnace, the action of burner 3 will be stepped-up to maintain the ignition temperature within the ignition tube 2, but will not be so operated that the tube substantially exceeds a temperature of 1200° F. Desirably the burner flame is utilized to produce a temperature approaching 2000° F. through the greater proportion of the treating tube before feeding the charge to the furnace. Under the other conditions stated, I have found a continuous rate of feed of about ¼ of a cubic foot per minute of ore and coal to produce about 12 cubic feet per hour of mixed output to be suitable. In the ignition tube, the mixed charge of ore and coal is brought to an ignition temperature and volatiles are evolved. Secondary combustion air is introduced at moderate velocity by way of secondary air valves 22 to pass around ignition tube 2, and being preheated to the extent of the influence of that tube, joins the products of combustion and volatiles from the fuel to pass downwardly through the treating tube. A basic apportionment of primary air and secondary air is about 30% of primary air to 70% of secondary air. This being one of the many variables involved in the conduct of my method, it is altered to suit the conditions of each particular operation as they develop. An initial insight into combustion conditions within the furnace is had by observing from the discharge end of the furnace the character of the flame which is produced by conjoint combustion of fuel and air from the primary inlet, together with the secondary air and volatiles from the coal. If the gases issuing from the discharge end of the treating tube are candle flame color and move with lazy velocity, the combustion conditions in the furnace primarily are correct. A dark, heavy, lazy flame means that air supply is inadequate properly to support combustion and additional secondary air is provided. A high speed, light orange colored flame indicates an excess of air and the supply of secondary air is appropriately reduced.

Inasmuch as the mechanism of my method requires that the charge be adequately heated without substantially commingling products of combustion with the charge, and since it requires that there be a temperature gradient reaching a maximum adjacent the discharge end of the furnace, desirably with concurrent completion of active combustion, the type and form of the heating flame is important. By introducing the burner flame axially of the furnace, and by surrounding that burner flame with an envelope of secondary air with the addition of combustible volatiles, I obtain a conical axially disposed flame tapering to a point adjacent the discharge end of the furnace. This flame most desirably should revolve slowly. Controls, which will be immediately described, are purposed to maintain the flame length so that combustion is complete and maximum temperature is reached adjacent the discharge end of the treating tube under the varied conditions encountered in the process, while maintaining the flame movement along the axis of the furnace and spaced from the charge. The flame thus radiates most of its heat to the refractory lining of the furnace, with some proportion passing by radiation directly to the charge.

Because my process is continuous, it is possible to adjust the many variables in accordance with observed conditions as the process proceeds; and because this continuity may extend for days and even weeks, lack of perfection in operation of the process prior to such adjustments is of negligible moment. Thus there is, as explained above, an adjustment in the proportioning of fuel and ore in the charge; an adjustment in the proportion of burner operation and secondary air for combustion of fuel produced by the charge itself; an adjustment in the angle at which the furnace is tilted; and an adjustment in the speed at which the furnace is rotated. These two latter adjustments both control the duration of the treatment in the treating tube of the furnace; that is, for any given angle of the furnace, a greater rotational speed will increase the speed of the charge travel through the furnace, as well as accelerating heat-transfer from the wall of the treating tube to the charge. This adjustment of variables is particularly useful because the variables must be adjusted not only to the sort of product desired, but also to differences in the batches of ore and fuel of which the charge is made up. For example, assuming that the apparatus shown as exemplary is used to produce sponge iron and it is observed initially that reduction is imperfect, observation of the flame and temperature-indicating instruments will indicate whether the defect is because of an inadequate excess of coke to complete reduction and prevent reoxidation, or if the deficiency is because of a temperature which is too low or a travel of the charge through the furnace which is too rapid. Based on these observations, appropriate adjustment may be made in fuel, air, or in the angular setting or rotational speed of the furnace, or in any combination of such variable-controlling adjustments.

Because of the fact that the combustion gases move downward in the direction of travel of the charge, the progress of combustion and the heating effect of the combustion in the different zones throughout the furnace is definitely under control, by correlating the factors of charge composition, burner combustion, and secondary air. It will be noted that the declination of the furnace causes a static pressure against which the heating flame moves under positive pressure from the burner and the secondary air flow. It has been noted that a relatively low temperature is maintained in the ignition tube of the furnace, and that the temperature within the length of the treating tube desirably approaches 2000° F. at the time feeding of the charge to the furnace is begun.

As combustion of the charge proceeds, there is a tendency for the temperature to drop because of the temperature required to drive off volatiles from the coal in the zone of the treating tube adjacent the ignition tube of the furnace; and because of the fact that heat continuously is utilized to support the endothermic reduction reaction between the iron oxides and the incandescent carbon, by transfer of oxygen from the ore to the coal of the charge which has been converted into incandescent coke by the time it reaches the reaction zone of the treating tube. In operation, I control the length and type of flame to provide heat in the reaction zone toward the discharging end of the furnace rather than in the zone adjacent the ignition tube of the furnace, so that if the treatment be conducted for the production of sponge iron, the temperature toward the receiving end of the treating tube will be about 1200° F. to 1500° F. and the temperature in the reaction zone toward the discharging end of the treating tube will be at a good reaction temperature such as about 1800° F. to 2200° F. Previous discussion will show that the relations in my process are such as to make such control effective.

As has been above indicated, the reduction reaction takes place within the charge itself, the reaction being between the iron ore and the coke which has been formed and brought into incandescency. Certain problems are inevitably present in a direct process of reducing iron oxide ores and other oxide ores. One such problem is to obtain in a reaction zone temperatures sufficiently high to promote reduction while effecting combustion and handling the charge in such manner that the conditions of the temperature-producing combustion do not destroy reducing conditions in the charge. Another problem is to prevent reoxidation of the iron as it is formed initially in substantially atomic condition rather than in definite physical particles. These problems are solved in my method by the condition of the charge, control of the combustion, by the composition and condition of the charge and its surrounding atmosphere at the time the charge including the desired product of the reaction is discharged from the furnace, and by the time allowed for the nascent iron to agglomerate into physical particles under such favorable conditions.

The effect in the furnace during an operation in accordance with my invention is that the heating flame passes through the furnace without bringing any substantial proportion of the combustion air directly into contact with the furnace charge. By utilizing the burner and the input of combustion air at the receiving end of the furnace definitely to direct the heating flame in the direction of charge flow and by avoiding the use of additional fuel or air blast at an intermediate point in the furnace, I obtain the desired increasing temperature gradient in the furnace and the charge up to a maximum adjacent the discharge end of the furnace. By utilizing a substantial excess of solid carbonaceous fuel under those other conditions, there is such excess of coke that reduction in the charge proceeds effectively, and the remaining excess of incandescent coke adjacent the discharge end of the furnace provides carbon-monoxide (CO) in excess of that required for combustion, effectively blanketing the carbon-dioxide and oxygen of the furnace atmosphere as the products of the treatment are discharged from the furnace. As above explained, the process is continuous, and under control to establish and maintain those effects by appropriate correction throughout the continuance of the process.

Assuming now that I am conducting an operation in accordance with my method to produce nodules or balls of iron with greater or lesser slag inclusion, the conditions of the process are intensified without substantially altering the balance between the variables. Thus in operating to such a product, I establish a temperature of from about 2250° F. to 2500° F. in the reaction zone and toward the discharge end of the furnace, and extend the length of the treatment by decreasing the angle of the furnace with possibly some retardation in its speed of revolution. The proportion of coal or other carbonaceous fuel in the charge is increased to maintain the excess of coke during the longer treatment, and desirably, burner action is also increased within reasonable limits. This increased combustion in the furnace does not unduly raise the temperature in the ignition tube, or in the zone of the treating tube adjacent the ignition tube, because additional heat is absorbed by the charge in raising it to its ignition temperature and initially promoting a coking effect in the fuel. Thus by making the time of treatment from 2 to 3 hours, or possibly slightly longer, with the increased temperature in the more advanced zones of the treating tube, conditions are established which cause the minute flakes, or grains, of sponge iron to agglomerate and weld into nodules or balls of substantial size under the softening effect of the relatively high temperature, and the tumbling action in the treating tube. Also, at the indicated temperature slag is in large measure fused and is eliminated from the nodules or balls of iron as they obtain substantial size and are agitated. The same type of flame as above described is, however, maintained in the balancing of conditions in this more vigorous treatment, and the same general proportion of primary burner air to secondary combustion-supporting air for the charge is maintained.

It should be emphasized that in my process the charge temperature necessary to support the endothermic reduction reaction is maintained chiefly by radiation to the refractory lining of the furnace and by heat-transfer from the furnace lining to the charge lying upon it, and in minor order by radiation directly to the charge itself. This is appropriate to the mechanism involved in my method by which reduction is effected by direct reaction between the components of the charge. To be effective, such condition requires that the reacting components be maintained in intimate contact throughout the body of the charge.

I find it to be a fact that such intimacy of contact is maintainable if the charge through at least the major portion of the reaction period be in the form of lumps or particles corresponding to small briquettes. I have discovered (and this discovery is a matter of great practical importance) that such briquette-like lumps or particles may be formed in the furnace, as an incident to the travel of the charge therethrough, and that they need not be formed in a preliminary step conducted exteriorly of the furnace.

An exemplary device for performing the briquetting operation in the furnace is shown in detail in Fig. III of the drawings. This device comprises a relatively heavy metallic bar or roll extended longitudinally of the ignition tube and anchored by means of a chain 27 and a swivel joint 28 to an insert cap 29 mounted in the outer wall of the stationary air chamber structure. As ignition tube 2 rotates with treating tube 1, bar or roll 26, being loosely and rotatably anchored, receives rotational and swinging movement by rotation of the ignition tube.

Bar, or roll, 26 in its movement thus exerts both a scraping and a compacting action on the mixture of finely-divided oxide ore and carbonaceous fuel forming the charge. The coal of the charge is thus agglomerated with the ore in substantial uniformity as the coal passes through its sticky stage and tends to build up on the wall of the tube. Then as the coal emerges from its sticky stage in the form of coke, the charge will have been formed or will be broken into lumps or particles composite of coke and of iron ore; the several particles containing substantially uniform proportions of ore and of coke, and having those components of the charge bound in intimate contact in condition ideally suitable for the subsequent reduction reaction.

If the coal included in the charge be deficient in tar-forming constituents, or if sawdust or other finely-divided vegetable matter be used as the carbonaceous content of the charge, or if coke breeze be used, I supply this deficiency by introducing coal tar or other suitable tarry substance into the ignition tube of the furnace to be mixed with the charge therein. Such tarry material serves initially so to bind the finely-divided components of the charge that the action of the briquetting roll, or an equivalent device, is effective to briquette the charge.

Obviously an effective briquetting within the furnace is economical as compared with a process in which briquettes are formed as a preliminary to a furnace treatment. My mode of briquetting as an incident to the treatment of the charge within the furnace presents further advantages. If the charge be introduced as preformed briquettes, softening of the coal in the charge, as coking proceeds, tends to build-up a sticky deposit on the interior of the furnace wall to an extent which causes undesirable obstruction to passage of the charge through the furnace. By briquetting in accordance with the procedure of my method, tarry substances which are formed as the coal passes through its sticky stage serve to bind the charge and thus contribute to the formation of briquettes under the mechanical action of the roll. This mechanical action of the roll by continually scraping the interior surface of the furnace wall prevents the building-up of deposits on the wall, and insures that the tarry content of the coal, serving as a binder and giving off volatiles, remains in the briquettes in the form of coke. While it is therefore my preferred practice to form the charge roughly into briquettes in the furnace adjacent its entering end, it is to be understood that I contemplate as within the bounds of my invention practice in which preformed briquettes are subjected to treatment under the combustion conditions above described, or in which the finely-divided iron oxide and the finely-divided carbonaceous fuel of the composite charge are otherwise maintained in intimate contact while heated to a reduction temperature under such combustion conditions.

The specific function of the ignition tube 2 in the process is to serve as a preparation tube both for the charge of metallic oxide and carbonaceous fuel, and for the combustion mixture going to make up the heating flame. Thus under the influence of the burner flame in tube 2, the finely divided coal of the charge gives off its lighter volatiles and also releases substantially its content of tar. Under the effect of roller 26 in tube 2, the agglomerated charge mixture composed of finely divided metallic oxide and finely divided coal are broken up into small lumps in which the metallic oxide and the coal are bound together by the tarry binder derived from the coal itself. Under the temperature to which the charge suitably is raised in this ignition or preparation tube the coal of the charge is at least partially coked and the coking coal or semi-coke content of the lumps, or small briquettes, which are formed is brought to a temperature at least approximating its ignition temperature. As the lumps of the compacted mixture, of which the charge is composed, are discharged from the preparation tube into the treating or reducing tube they are thus in condition for their coke content readily to acquire incandescence and for the coke and oxides to enter into the reduction reaction.

Under the independently performed preparatory treatment in tube 2 there is also, as above noted, an addition of combustible volatiles to the flame in the tube, and a substantial expansive effect is created in the tube to force the combustion mixture forwardly therefrom and downwardly through the treating tube. At the leaving end of the ignition and preparation tube 2, those gases are surrounded by an envelope of low velocity air, entering by way of annular passage 21 between the outer surface of tube 2 and the inner surface of tube 1, and preheated by contact with the wall of tube 2. This gives an inner flame moving forward, and which inner flame is surrounded for further combustion by the envelope of preheated low velocity air. With proper furnace regulation, there is therefore produced the described luminous flame, or candle flame, by the liberation of free carbon from the decomposition of the supplied fluid fuel of the burner and the volatiles liberated in preparation tube 2. Both the preparation of the charge as a suitably compacted and heated mixture of metallic oxide and coke and the conditions which go to make up the forwardly moving luminous flame are of importance in producing in the treating tube the conditions which have been described above and which result in an effective and economical reduction of the metal oxides of the charge to metallic state.

Whereas the foregoing disclosure of my method has been directed primarily and in terms to the reduction of iron oxide ores, it may be applied advantageously to oxide ores of all other metals which are susceptible of reduction in the same manner. Thus the oxide ores of nickel, cobalt, copper, and tin, for example, require only such adjustment in the conditions of the process fundamentally described above as is within the knowledge of metallurgists skilled in the smelting of such various metals from their oxides.

It has been explained that ore reduction in accordance with my method is controllable to produce metals, and specifically metallic iron in different physical forms. Such products are adapted to various uses and are susceptible either to direct working or to further treatment. Thus the nodules or balls of iron as produced by a relatively extended time of treatment may, if desired, be used as the charging stock for open hearth furnaces and the like, or may be subjected to further treatment and working. The product of a less extended treatment in the form of sponge iron may be brought into the form of such nodules or balls and then used, or may be further treated. The conduct of the treatment as to its duration and conditions is thus in practical effect dependent upon the use to which the product of the furnace is to be put and the comparative economy involved in carrying the treatment to the maximum or terminating it at a less advanced stage. It is to be noted that at the temperature of the treatment reaching a maximum of about 2250° F. to 2500° F. (for nodular iron), the iron does not substantially take up carbon from the incandescent coke, and my product is therefore a very low carbon iron usually running from about .02% to .05% carbon. This fact greatly widens the metallurgical uses of my product iron.

It is to be understood that, as I conduct my method, a stack associated with the furnace functions merely to lead off products of combustion, and not to create an induced draft through the furnace. The uniflow effect, in which combustion proceeds in the direction of charge travel, is attained by positive pressure without utilizing induced draft. The fact that the flame and products of combustion move through the furnace under slightly superatmospheric pressure rather than subatmospheric pressure permits the flame to assume the definite form and position described above; with the axially disposed flame tapering to a point adjacent the discharge end of the furnace, and with maximum furnace temperature in that region.

It has been indicated above that the apparatus herein shown and described is exemplary only of many apparatus embodiments in which the method of my invention may be practiced. The method itself clearly may be varied within wide limits while remaining within the bounds of my invention as defined by the appended claims.

I claim as my invention:

1. The herein described method of reducing metallic oxides which comprises continuously feeding a mixed charge composed of finely divided metallic oxide with an excess of finely divided coal into a rotated forwardly declining ignition and preparation tube while directing a burner flame forwardly through said tube, by thus heating the charge mixture in the said ignition and preparation tube releasing combustible volatiles and tarry content from the coal thereof while at least partially coking the coal, in said ignition and preparation tube forming the agglomerated charge mixture into lumps with the metallic oxide and the at least partially coked coal thereof in intimate contact, continuously discharging the said prepared and preheated charge into a rotated forwardly declining treating tube together with a combustion mixture composed of the burner flame and combustible volatiles released from the coal, surrounding the said combustion mixture entering the treating tube with a combustion supporting envelope of low velocity secondary air, and effecting reduction of the metallic oxide in the intimate charge mixture by continuously passing the charge downwardly through the said treating tube while extending in the direction of charge movement a luminous flame composed of the said combustion mixture and air envelope moving under the positive pressure created by the said burner flame and the said secondary air.

2. The herein described method of reducing metallic oxides which comprises continuously feeding a mixed charge composed of finely divided metallic oxide with an excess of finely divided coal into a rotated forwardly declining ignition and preparation tube while directing a burner flame forwardly through said tube, by thus heating the charge mixture in the said ignition and preparation tube to a temperature within an upper limit of about 1200° F. releasing combustible volatiles and tarry content from the coal thereof while at least partially coking the coal, in said ignition and preparation tube breaking up the agglomerated charge mixture into lumps with the metallic oxide and the at least partially coked coal thereof in intimate contact, continuously discharging the said prepared and preheated charge into a rotated forwardly declining treating tube together with a combustion mixture composed of the burner flame and combustible volatiles released from the coal, surrounding the said combustion mixture entering the treating tube with a combustion supporting envelope of low velocity secondary air preheated by contact with the said preparation tube, and effecting reduction of the metallic oxide in the intimate charge mixture by continuously passing the charge downwardly through the said treating tube while extending in the direction of charge movement a luminous flame composed of the said combustion mixture and air envelope moving under the positive pressure created by the said burner flame and the said secondary air.

3. The herein described method of reducing iron oxides which comprises continuously feeding a charge mixture composed of finely divided iron oxide with an excess of finely divided coal through a rotated forwardly declining ignition and preparation tube, in said preparation tube under the heating effect of a burner flame releasing light volatiles and tarry content from the coal of the charge and raising the charge to the ignition temperature of the volatiles released by such heating, rolling the charge into lumps in the said preparation tube, continuously discharging the lumps containing iron oxide and coke in intimate contact together with a combustion mixture composed of the burner flame and light volatiles released from the coal into a rotated forwardly declining treating tube, surrounding the said combustion mixture entering the treating tube with a combustion supporting envelope of low velocity secondary air, and effecting reduction of the iron oxide in the charge lumps by continuously passing the charge downwardly through the treating tube while extending in the direction of charge movement a luminous flame composed of the said combustion mixture and air envelope moving under the positive pressure created by the said burner flame and the said secondary air.

4. The herein described method of reducing iron oxides which comprises continuously feeding a charge mixture composed of finely divided iron oxide with an excess of finely divided coal through a rotated forwardly declining ignition and preparation tube, in said preparation tube under the heating effect of a burner flame releasing light volatiles and tarry content from the coal of the charge and raising the charge to a temperature within an upper limit of about 1200° F., rolling the charge into lumps in the said preparation tube, continuously discharging the lumps containing iron oxide and coke formed by such heating in intimate contact together with a combustion mixture composed of burner flame and light volatiles released from the coal into a rotated forwardly declining treating tube, surrounding the said combustion mixture entering the treating tube with a combustion supporting envelope of low velocity secondary air preheated by contact with the said preparation tube, and effecting reduction of the iron oxide in the charge lumps by continuously passing the charge downwardly through the treating tube while extending in the direction of charge movement a luminous flame composed of the said combustion mixture and air envelope moving under the positive pressure created by the said burner flame and the said secondary air.

5. The herein described method of reducing metallic oxides which comprises continuously feeding a charge mixture composed of finely divided metallic oxide with an excess of finely divided coal through a rotated forwardly declining ignition and preparation tube, in said preparation tube under the heating effect of a burner flame releasing light volatiles and tarry content from the coal of the charge and raising the charge to the ignition temperature of the volatiles released by such heating, rolling the charge into lumps in the said preparation tube, continuously discharging the lumps containing metallic oxide and coke in intimate contact together with a combustion mixture composed of the burner flame and light volatiles released from the coal into a rotated forwardly declining treating tube, surrounding the said combustion mixture entering the treating tube with a combustion supporting envelope of low velocity secondary air, and effecting reduction of the metallic oxide in the charge lumps by continuously passing the charge downwardly through the treating tube while extending in the direction of charge movement and to a terminus in a region of maximum temperature adjacent the discharge end of the treating tube a luminous flame composed of the said combustion mixture and air envelope moving under the positive pressure created by the said burner flame and the said secondary air.

6. The herein described method of reducing metallic oxides which comprises continuously feeding a charge mixture composed of finely divided metallic oxide with an excess of finely divided coal through a rotated forwardly declining ignition and preparation tube, in said preparation tube under the heating effect of a burner flame releasing light volatiles and tarry content from the coal of the charge and raising the charge to a temperature within an upper limit of about 1200° F., rolling the charge into lumps in the said preparation tube, continuously discharging the lumps containing metallic oxide and coke formed by such heating in intimate contact together with a combustion mixture composed of burner flame and light volatiles released from the coal into a rotated forwardly declining treating tube, surrounding the said combustion mixture entering the treating tube with a combustion supporting envelope of low velocity secondary air preheated by contact with the said preparation tube, and effecting reduction of the metallic oxide in the charge lumps by continuously passing the charge downwardly through the treating tube while extending in the direction of charge movement and to a terminus in a region of maximum temperature adjacent the discharge end of the treating tube a luminous flame composed of the said combustion mixture and air envelope moving under the positive pressure created by the said burner flame and the said secondary air.

7. The herein described method of reducing metallic oxides which comprises continuously feeding a charge mixture composed of finely divided metallic oxide with an excess of finely divided coal into the ignition and preparation tube of a rotated forwardly declining furnace composite of two co-axially mounted tubes of which the ignition and preparation tube is of lesser diameter and volumetric capacity than the second and treating tube, continuously directing a burner flame forwardly through the said ignition and preparation tube to heat the charge mixture therein thus to release combustible volatiles and tarry content from the coal of the charge mixture while at least partially coking the coal thereof, in said ignition and preparation tube breaking the agglomerated charge mixture into lumps with the metallic oxide and the at least partially coked coal thereof in intimate contact, continuously discharging the said prepared and preheated charge into the treating tube of greater volumetric capacity together with a combustion mixture composed of the burner flame and combustible volatiles released from the coal, surrounding the said combustion mixture entering the treating tube with a combustion supporting envelope of low velocity secondary air, and effecting reduction of the metallic oxide in the intimate charge mixture by continuously passing the charge downwardly through the said treating tube while extending in the direction of charge movement a luminous flame composed of the said combustion mixture and air envelope moving under the positive pressure created by the said burner flame and the said secondary air.

8. The herein described method of reducing metallic oxides which comprises continuously feeding a charge mixture composed of finely divided metallic oxide with an excess of finely divided coal into the ignition and preparation tube of a rotated forwardly declining furnace composite of two co-axially mounted tubes of which the ignition and preparation tube is of lesser diameter and volumetric capacity than the second and treating tube, continuously directing a burner flame forwardly through the said ignition and preparation tube to heat the charge mixture therein to a temperature within an upper limit of about 1200° F. thus to release combustible volatiles and tarry content from the coal of the charge mixture while at least partially coking the coal thereof, in said ignition and preparation tube breaking the agglomerated charge mixture into lumps with the metallic oxide and the at least partially coked coal thereof in intimate contact, continuously discharging the said prepared and preheated charge into the treating tube of greater volumetric capacity together with a combustion mixture composed of the burner flame and combustible volatiles released from the coal, surrounding the said combustion mixture entering the treating tube with a combustion supporting envelope of low velocity secondary air, and effecting reduction of the metallic oxide in the intimate charge mixture by continuously passing the charge downwardly through the said treating tube while extending in the direction of charge movement a luminous flame composed of the said combustion mixture and air envelope moving under the positive pressure created by the said burner flame and the said secondary air.

9. The herein described method of reducing iron oxides by continuously passing a charge mixture composed of finely divided iron oxide with an excess of finely divided coal into and through a furnace composite of two coaxially mounted forwardly declining rotary tubes of unequal diameter and volume, the first and entering tube of the pair being of lesser diameter and volumetric capacity than the second and reduction tube, by a burner flame producing restricted combustion in the entering tube of the furnace with release of combustible volatiles from the coal of the charge mixture to form a combustion mixture and to produce partial coking of the said coal, discharging the prepared charge mixture and the combustion mixture containing combustible volatiles into the reduction tube with movement of the charge mixture downwardly through the said reduction tube and with movement of the combustion mixture downwardly therethrough under pressure from the said entering tube, and raising the temperature of the charge mixture to complete coking of the coal of the charge and to reduce the iron oxide by reaction with such coke under substantially complete combustion in the combustion mixture by introducing thereto without added fuel an envelope of combustion air directed downwardly of the reduction tube.

10. The herein described method of reducing iron oxides by continuously passing a charge mixture composed of finely divided iron oxide and finely divided coal in the approximate proportion of 1 to 2 parts of coal to each 2 parts by weight of metallic content of the iron oxide into and through a furnace composite of two coaxially mounted forwardly declining rotary tubes of unequal diameter and volume, the first and entering tube of the pair being of lesser diameter and volumetric capacity than the second and reduction tube, by a burner flame producing restricted combustion in the entering tube of the furnace with release of combustible volatiles from the coal of the charge mixture to form a combustion mixture and produce partial coking of the said coal, discharging the prepared charge mixture and the combustion mixture containing combustible volatiles into the reduction tube with movement of the charge mixture downwardly through the said reduction tube and with movement of the combustion mixture downwardly therethrough under pressure from the said entering tube, and raising the temperature of the charge mixture to complete coking of the coal of the charge and to reduce the iron oxide by reaction with such coke under substantially complete combustion in the combustion mixture by introducing thereto without added fuel an envelope of combustion air directed downwardly of the reduction tube.

11. The herein described method of reducing iron oxides by continuously passing a charge mixture composed of finely divided iron oxide with an excess of finely divided solid carbonaceous fuel into and through a tubular rotary furnace mounted to decline toward its discharge end, by a burner flame producing restricted combustion in the entering and upper region of the furnace with release of combustible volatiles from the said fuel of the charge mixture to form a combustion mixture and to produce partial coking of the said carbonaceous fuel, continuing downward movement of the prepared charge mixture with movement of the combustion mixture downwardly through the furnace under pressure from the said entering region of the furnace, and in such continued travel of the charge mixture raising the temperature thereof to complete coking of the carbonaceous fuel of the charge and to reduce the iron oxide by reaction with such coke under substantially complete combustion in the combustion mixture by adding thereto without added fuel secondary combustion air directed downwardly of the furnace.

12. The herein described method of reducing iron oxides by continuously passing a charge mixture composed of finely divided iron oxide and finely divided coal in the approximate proportion of 1 to 2 parts of coal to each 2 parts by weight of metallic content of the iron oxide into and through a tubular rotary furnace mounted to decline toward its discharge end, by a burner flame producing restricted combustion in the entering and upper region of the furnace with release of combustible volatiles from the coal of the charge mixture to form a combustion mixture and to produce partial coking of the said coal, continuing downward movement of the prepared charge mixture with movement of the combustion mixture downwardly through the furnace under pressure of the said entering region of the furnace and in such continued travel of the charge mixture raising the temperature thereof to complete coking of the coal of the charge and to reduce the iron oxide by reaction with such coke under substantially complete combustion in the combustion mixture by adding thereto without added fuel secondary combustion air directed downwardly of the furnace.

13. The herein described method of reducing metallic oxides which comprises feeding a charge mixture composed of finely divided metallic oxide with an excess of finely divided solid carbonaceous fuel with tarry substance into the ignition and preparation region of a rotated forwardly declining tubular furnace, continuously directing a burner flame forwardly through the said ignition and preparation region of the furnace to heat the charge mixture therein adequately to release combustible volatiles from the carbonaceous fuel of the charge mixture and partially to coke the said fuel, in said ignition and preparation region of the furnace breaking the agglomerated charge mixture into lumps with the metallic oxide and the at least partially coked fuel thereof in intimate contact, continuing downward movement of the said prepared charge mixture together with a combustion mixture composed of the burner flame and combustible volatiles released from the fuel of the charge into and through a reduction region of the furnace, adding to the said combustion mixture in the said reduction region a combustion supporting envelope of low velocity secondary air, and effecting reduction of the metallic oxide in the intimate charge mixture by continuously passing the charge downwardly through the reduction region of the furnace while extending in the direction of charge movement a luminous flame composed of the said combustion mixture and air envelope moving under the positive pressure created by the said burner flame and the said secondary air.

14. The herein described method of reducing metallic oxides which comprises continuously feeding the charge mixture composed of finely divided metallic oxide with an excess of finely divided solid carbonaceous fuel into the ignition and preparation region of a rotated forwardly declining tubular furnace, continuously directing a burner flame forwardly through the said ignition and preparation region of the furnace to heat the charge mixture therein adequately to release combustible volatiles from the fuel of the charge mixture and partially to coke the said fuel, continuing downward movement of the said prepared charge mixture together with the combustible mixture composed of the burner flame and volatiles released from the fuel of the charge into and through a reduction region of the furnace, adding to the said combustion mixture in the said reduction region a supporting envelope of low velocity secondary air, and effecting reduction of the metallic oxide in the intimate charge mixture by continuously passing the charge downwardly through the reduction region of the furnace while extending in the direction of charge movement a luminous flame composed of the said combustion mixture and air envelope moving under the positive pressure created by the said burner flame and the said secondary air.

NORMAN J. URQUHART.